July 16, 1963 E. DAWSON 3,097,794
SPRAYING DEVICE
Filed July 7, 1961 2 Sheets-Sheet 1
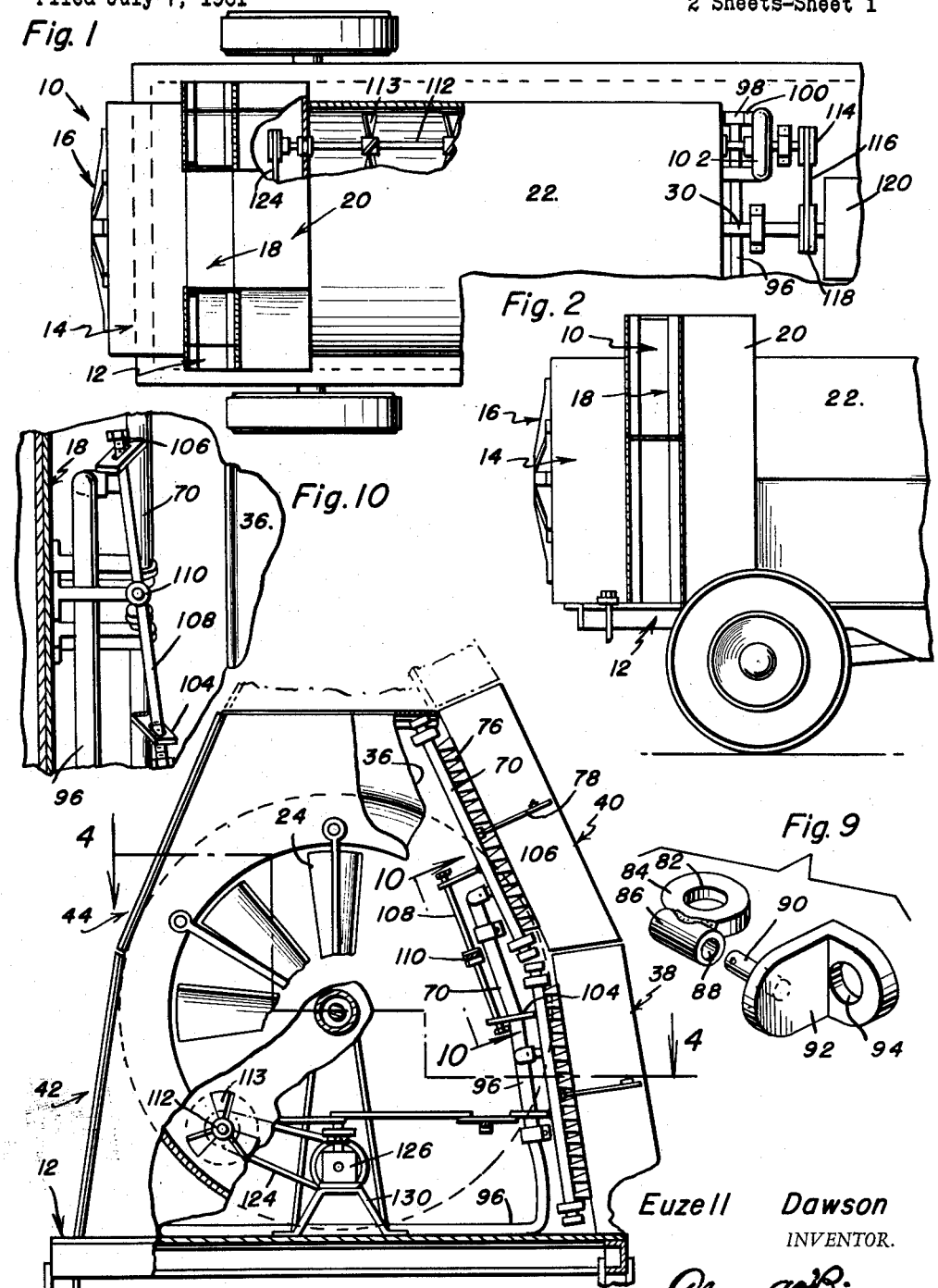
Euzell Dawson
INVENTOR.

July 16, 1963 E. DAWSON 3,097,794
SPRAYING DEVICE
Filed July 7, 1961 2 Sheets-Sheet 2
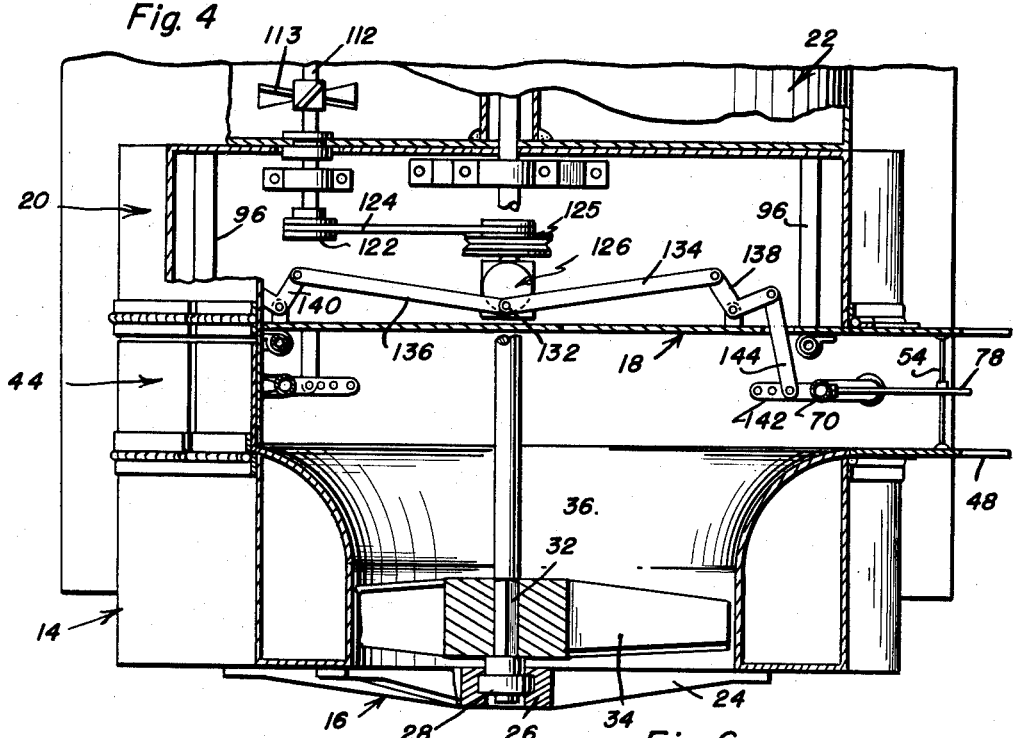
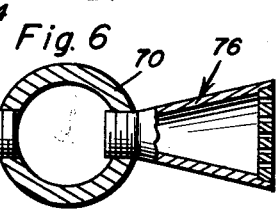
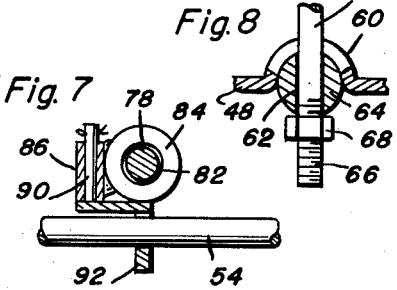
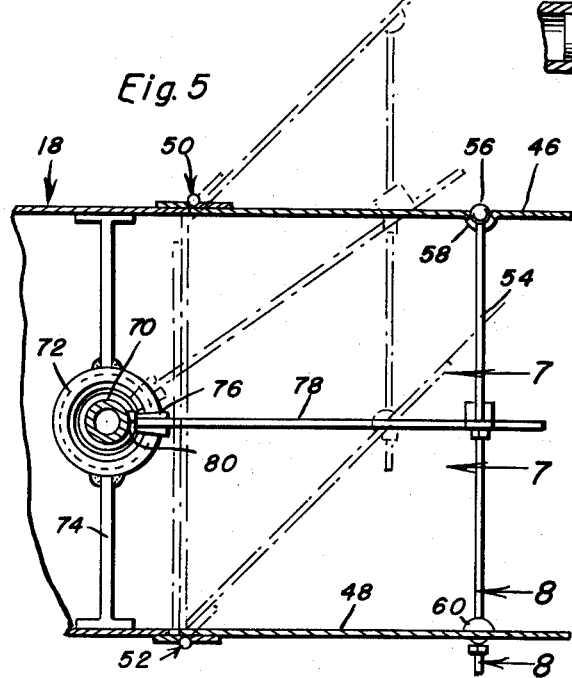
Euzell Dawson
INVENTOR.

United States Patent Office 3,097,794
Patented July 16, 1963

3,097,794
SPRAYING DEVICE
Euzell Dawson, P.O. Box 217, Orosi, Calif.
Filed July 7, 1961, Ser. No. 122,443
1 Claim. (Cl. 239—78)

This invention relates to a power spraying machine for applying spray materials to trees of different types and sizes.

Machines for applying insecticide, fungicides, liquid materials, dusting materials and other spray materials in connection with orchard grown trees, have heretofore been used or proposed but have inherently embodied various undesirable features and have not been as effective as could be for all spraying requirements. It is therefore a primary object of the present invention, to provide a spraying machine which will be more useful and more effective for the different spraying requirements associated with trees of different types, sizes and in different stages of growth.

Another object of this invention is to provide a spraying machine which is selectively adjustable and capable of being conditioned for use under a wider variation of spraying requirements than was heretofore thought possible.

A further object of this invention is to provide a spraying machine capable of accommodating the varying spraying requirements heretofore mentioned without any appreciable sacrifice of efficiency and moreover is operable with even greater efficiency than those spraying machines restricted in use to one particular type of tree.

An additional object of the present invention is to provide an orchard spraying machine capable of continuously supplying a constant volumetric flow of air and spray material from opposite lateral sides of the machine at different angles and in different changing directions. Accordingly, the spray so delivered to the trees is better distributed throughout the tree limbs and foliage providing better coverage.

A still further object of this invention is to provide a spraying machine in which the spray material concentration may be regulated by varying the spray directing openings on opposite lateral sides of the spraying machine housing so as to better accommodate the varying requirements as heretofore mentioned.

Another object of this invention is to provide a spraying machine for orchard trees including oscillating spray directing outlet sections, the drive of which may be varied in order to vary the delivery velocity and consequently the spray range of the spray material.

The orchard spraying machine of the present invention further features a novel synchronizing arrangement whereby the oscillating drive to any outlet section of the machine may be selectively interrupted for closing off such outlet sections and also when operative, to continuously center the spray material discharge nozzle with respect to the oscillating outlet air stream.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a partial top plan view with parts shown in section of the spraying machine of the present invention.

FIGURE 2 is a partial side elevational view of the spraying machine.

FIGURE 3 is an enlarged partial rear elevational view of the spraying machine which is partly broken away;

FIGURE 4 is a partial sectional view taken substantially through a plane indicated by section line 4—4 in FIGURE 3.

FIGURE 5 is an enlarged partial sectional view through one of the directed outlet sections of the present invention.

FIGURE 6 is an enlarged partial sectional view of the spray material discharge arrangement.

FIGURE 7 is a partial sectional view taken substantially through a plane indicated by section line 7—7 in FIGURE 5.

FIGURE 8 is a partial sectional view taken through a plane indicated by section line 8—8 in FIGURE 5.

FIGURE 9 is a perspective view of the disassembled connection between certain parts as shown in FIGURE 7.

FIGURE 10 is a partial sectional view as viewed from a plane indicated by section line 10—10 in FIGURE 3.

Referring now to the drawings in detail, it will be observed from FIGURES 1 and 2, that the spraying machine of the present invention which is generally referred to by reference numeral 10 is mounted on a vehicle chassis 12, the rear portion of which supports a blower housing 14 having a rearwardly disposed air inlet 16. Connected to the blower housing 14 and disposed on the forward side thereof, is a spray outlet housing generally referred to by reference numeral 18. The outlet housing 18 in turn is connected on its forward side to a housing section 20 containing therewithin drive mechanism for performing various functions of the machine as will hereafter be explained. Connected to the housing section 20 is a supply tank 22 which contains the spray material that may be in the form of liquid or dust and of a composition depending upon the use to which the spray material is being applied to the tree.

Referring now to FIGURES 3 and 4 in particular, it will be observed that the blower housing 14 mounts on its rear end, the air directing vanes 24 of the inlet 16 which radiate from a centrally disposed hub portion 26. A journal bearing assembly 28 is mounted within the hub 26 and supports therewithin one end of a fan shaft 30. A blower fan blade assembly 34 is mounted for rotation with the fan shaft 30 by any suitable means such as a squared portion 32 on the shaft 30 and is disposed just rearwardly of and adjacent to the inlet 16 for impelling air into the fan discharge passage 36 at a large volumetric flow rate and velocity. The discharge passage 36 communicates with the outlet housing 18 as more clearly seen in FIGURE 4. Air is accordingly directed outwardly from the machine from both lateral sides of the outlet housing 18 at a velocity dependent upon the design characteristics of the blower fan assembly 34 and its rotative speed.

The outlet housing 18 has hingedly mounted on opposite lateral sides thereof, a plurality of spray directing outlet sections 38, 40, 42 and 44. Although only two sections are illustrated on each lateral side of the housing 18 as more clearly shown in FIGURE 3, it will be appreciated that additional outlet sections may be added as for example to the top portion of the housing 18 as suggested in FIGURE 3 by dotted line. The spraying machine may thereby be modified when spraying requirements demand. It will be observed, that the spray directing outlet sections on each lateral side of the machine are disposed at different angles with reference to a vertical plane parallel to the longitudinal axis of the spraying machine as viewed in FIGURE 1. Stated differently, the outlet sections are mounted at an angular relation to each other when viewed in a vertical plane normal to said longitudinal axis and as shown in FIGURE 3.

Referring now to FIGURE 5 in particular, it will be observed that each of the spray directing outlet sections includes a pair of oscillating spray directing vane members 46 and 48. The vane members are respectively hinged to the fixed walls of the housing 18 by longitudinally extending hinge assemblies 50 and 52. It will therefore be apparent, that the outlet opening for the discharge of the air and spray material from each spray directing outlet section will be determined by the spacing between the vane members 46 and 48. Furthermore, it will be observed that by maintaining the spacing between the vane members constant, oscillation of the vane members as indicated by dotted line in FIGURE 5 may change the direction of the spray air stream without appreciably changing or reducing the volumetric flow rate measured at the fan discharge passage 36 during the oscillatory movement of the vane members. As shown in FIGURES 3 and 5, the vanes 46 and 48 are plane members.

The spacing between the vane members of each of the spray directing outlet sections, is therefore maintained at an adjusted size by means of an opening adjusting rod 54. The adjusting rod 54 is therefore provided with a pivot element 56 at one end thereof received within a slotted pivot formation in the vane member 46. The other end of the adjusting rod 54 as more clearly seen in FIGURE 8, extends through a slotted formation 60 in the vane member 48 and through an aperture 62 in a pivot ball element 64 received in the formation 60. The adjusting rod member 54 is therefore provided with a threaded portion 66 threadedly mounting an adjusting nut 68 whereby the effective connecting length of the adjusting rod member 54 may be varied in order to vary the spacing between the vane members 46 and 48.

Each of the outlet sections has associated therewith a rotatably mounted spray supply conduit 70 which is rotatably mounted by spaced journal brackets 72 that are supported by journal bracket support members 74 fixed to opposite sides of the journal and mounted on the walls of the fixed outlet housing 18. The supply conduit section 70 has connected thereto a plurality of spaced nozzle devices 76 as more clearly seen in FIGURE 6. Spray material supplied to the conduit sections 70 is thereby discharged through the nozzle devices 76 in a direction determined by the angular position of the rotatably mounted conduit section 70. It will therefore become apparent, that a synchronizing rod member 78 associated with each spray directing outlet section will assure that the spray nozzle devices 76 direct the spray material centrally of the air stream passing between the vane members 46 and 48. The synchronizing rod member 78 is therefore selectively connected to the conduit section 70 by threaded engagement within nut members 80 which are welded to the conduit section 70. The synchronizing rods 78 are also connected to the adjusting rod members 54 equally spaced from the pivot projections 58 and 60 on the vane members 46 and 48. Accordingly, when the conduit sections 70 are oscillated, the synchronizing rod members 78 will impart oscillation to the vane members while at the same time maintaining the angular position of the spray directing nozzle devices 76 parallel to the vane members in order to center the discharge of spray material within the air stream. Any suitable connection may therefore be provided as for example shown in FIGURES 7 and 9. The synchronizing rod members 78 extend loosely through apertures 82 within an element 84 welded to a portion 86 having a bore 88 disposed perpendicular to the opening 82 for receiving a pin 90 fixed to a bracket member 92 having an opening 94 receiving the adjusting rod member 54 therethrough. Slidable and pivotal movement of the synchronizing rod member 78 with respect to the adjusting rod member 54 is thereby accommodated while at the same time the synchronizing rod 78 is maintained in equally spaced relation between the oscillating vane members 46 and 48.

Each of the supply conduit sections 70 is supplied with spray materials through a flexible conduit 96. The conduit 96 is therefore connected by a T-coupling 98 to a discharge conduit 100 connected to a spray material pump 102 fixedly mounted forwardly of tank 22. The pump inlet is therefore connected to the spray material supply tank 22.

Referring now to FIGURES 3 and 10 in particular, it will become apparent, that the conduit section 70 of adjacent spray directing sections 38 and 40 are mechanically interconnected so that they operate in opposite directions. Accordingly, any suitable mechanical linkage may be provided for such purpose as for example projecting arm members 104 and 106 interconnected by a lever element 108 which is pivotally mounted in fixed relation between the conduit sections 70 by a pivot bracket 110 fixedly mounted on the wall of the outlet housing 18. Oscillatory drive imparted to the conduit section 70 of the lower outlet section 38 will therefore impart oscillatory movement to the conduit section 70 of the upper outlet section 40 simultaneously but in an opposite direction. Similar mechanical interconnecting mechanism is therefore provided between the outlet sections 42 and 44 on the other side of the outlet housing 18.

The spraying machine 10 is also provided with drive mechanism for operating the fan blower, the pump 102 and for oscillating the conduit section 70 of the blower outlet sections 38 and 42. As more clearly seen in FIGURE 1, power is furnished to agitator shaft 112 having spaced agitator blade assemblies 113 connected thereto within the tank 22 for mixing the spray material. Connected to the rear end of the agitator shaft 112, is a pulley assembly 114. The pulley assembly 114 is belt connected by belt 116 to drive pulley assembly 118 connected to the forward end of the fan shaft 30 driven by motor 120. Accordingly, power is also applied to the shaft 112 to simultaneously operate the spray material pump 102. A drive belt 124 is entrained about pulley assembly 122 connected to the rear end of shaft 112 and the pulley assembly 125 in order to impart drive to the input of a gear box 126, the output of which is connected to a drive crank member 128. The gear box 126 is supported on a centrally disposed supporting bracket 130. The gear box may also be of the variable speed drive type so that the output speed of the crank member 128 may be varied for the purpose of varying the oscillatory speed of the spray directing vane members of the outlet section. The drive crank member 128 is connected by a crank pin 132 to a pair of pitmans 134 and 136. The pitmans are respectively connected through lever elements 138 and 140 to adjustable drive arm members 142 through connecting link members 144. The drive arm members 142 are rigidly connected as by welding to the conduit section 70 of the blower outlet sections 38 and 42. It will therefore be apparent, that power applied to the shaft 112 imparts rotation to the crank member 128 for oscillating the conduit sections 70 through the drive arms 142. The link connection to the drive arm 142 may be varied through removable connections to a plurality of apertures on the drive arms whereby the amplitude of the oscillatory stroke may be changed as desired. Oscillatory movement imparted to the conduit sections 70 are in turn imparted to the vane members 46 and 48 of each of the outlet sections, by means of the synchronizing rod members 78 and adjusting rod members 54 which interconnect the vane members in adjusted equally spaced relation to the synchronizing rod.

From the foregoing description, operation and utility of the present invention will be apparent. It will therefore be appreciated, that when the power shaft 112 is energized, the blower will be operative to impel a strong blast of air through fan discharge passage 36 into the outlet housing 18 for delivery through the outlet sections on opposite lateral sides of the housing 18 in respective directions of discharge dependent upon angular inclination of each outlet section in relation to the aforementioned vertical plane. Simultaneously therewith, the pump 102 is energized so as to supply from the spray supply tank 22 spray material into the oscillating supply conduit sections 70 associated with each of the outlet sections. By adjusting the spacing between the vane members of each outlet section, the amount of spray material in proportion to the passage of air may be varied. At the same time, the spray material will be discharged through the spray nozzle devices 76 centrally of the adjustably spaced vane members regardless of the angular position of the spray nozzle devices. As a result of the foregoing arrangement, wherein the sprays are directed at constant volumetric rates in changing directions and at different angles, better distribution and coverage of the trees is made possible particularly in deciduous trees where exposed limbs may block coverage to other limbs positioned therebehind with respect to a directionally fixed spray. Furthermore, by varying the length of stroke of the oscillating vane members and the speed thereof, the spray coverage and distance range may be varied in accordance with the desired spraying requirements. Finally, the drive arrangement of the present invention makes possible the closing off of any outlet section including for example one entire side of the outlet housing 18 as illustrated in FIGURES 3 and 4 with respect to outlet sections 42 and 44. This may be readily effected by selective removal of the synchronizing rod members 78 from the outlet sections one desires to close off. The drive to selected vane members is thereby interrupted and such vane members may be folded one upon the other as shown in dotted line in FIGURE 5 and as shown in FIGURE 4, with respect to the outlet section 44 to block both the air flow from such outlet section and the spray devices associated therewith. A more forcefully directed spray may thereby be applied through the opened and operative outlet sections which is particularly useful under certain spraying requirements as for example in connection with citrus trees.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

In a spray machine including a vehicle mounted for earth traversing movement in a predetermined direction, a fan housing mounted on the vehicle and having an erect elongated outlet slot opening from the housing transversely of the vehicle, power driven means carried by the vehicle for forcing an air blast out through the outlet, and means supported on the housing for introducing spray material into the air blast to form an air-borne spray stream; a mechanism for oscillating the spray stream to achieve maximum spray distribution and foliage penetration comprising a pair of substantially parallel vanes, means mounting the vanes on opposite sides of the outlet for pivotal movement about respective axes parallel to each other annd lying in respective planes substantially normal to the predetermined direction, the vanes defining a spray stream passage therebetween in registry with the housing outlet slot, means pivotally mounting the spray material introducing means on the housing substantially equidistantly between the longitudinal limits of said outlet slot to permit discharge of the material into the air blast in selective directions, power driven means connected to the vanes oscillating the vanes about their respective axes in substantial parallelism whereby the spray stream is discharged laterally of the vehicle and oscillated longitudinally thereof during earth traversing movement including means connected to the pivotal mounting means for the introducing means to effect oscillation of the introducing means synchronized with oscillation of the vanes whereby the discharge direction of the spray material is substantially aligned with the vanes and the spray stream direction.

References Cited in the file of this patent

UNITED STATES PATENTS

| | | |
|---|---|---|
| 2,220,082 | Daugherty | Nov. 5, 1940 |
| 2,593,275 | Daugherty | Apr. 15, 1952 |
| 2,641,503 | Wright et al. | June 9, 1953 |
| 2,643,155 | Wright et al. | June 23, 1953 |

FOREIGN PATENTS

| | | |
|---|---|---|
| 588,592 | Great Britain | May 28, 1947 |